United States Patent
Satomura

(10) Patent No.: US 9,881,500 B2
(45) Date of Patent: Jan. 30, 2018

(54) INFORMATION PROCESSING DEVICE

(71) Applicant: DENSO CORPORATION, Kariya, Aichi-pref. (JP)

(72) Inventor: Shota Satomura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/282,053

(22) Filed: Sep. 30, 2016

(65) Prior Publication Data

US 2017/0103653 A1 Apr. 13, 2017

(30) Foreign Application Priority Data

Oct. 9, 2015 (JP) .................................. 2015-201245

(51) Int. Cl.
  *G08G 1/0967* (2006.01)
  *G08G 1/0968* (2006.01)
  *G06F 3/147* (2006.01)

(52) U.S. Cl.
  CPC ......... *G08G 1/09675* (2013.01); *G06F 3/147* (2013.01); *G08G 1/0968* (2013.01); *G09G 2380/06* (2013.01); *G09G 2380/10* (2013.01)

(58) Field of Classification Search
  CPC ............. G08G 1/09675; G08G 1/0968; G09G 2380/10
  USPC ........................................................ 340/905
  See application file for complete search history.

(56) References Cited

U.S. PATENT DOCUMENTS

| 5,908,464 A * | 6/1999 | Kishigami ............. G01C 21/36 340/988 |
| 6,289,278 B1* | 9/2001 | Endo .................. B60K 31/0008 340/988 |
| 2004/0210383 A1 | 10/2004 | Sato |
| 2007/0177014 A1 | 8/2007 | Frenzel et al. |
| 2012/0046806 A1* | 2/2012 | Yokota ................. B62D 5/0457 701/1 |
| 2012/0197525 A1* | 8/2012 | Noro .................... G09B 29/106 701/437 |
| 2014/0111540 A1* | 4/2014 | Morimoto .............. B60K 35/00 345/619 |
| 2014/0169630 A1* | 6/2014 | Fukata ................... G08G 1/167 382/103 |

(Continued)

FOREIGN PATENT DOCUMENTS

JP 2016138866 * 8/2016

*Primary Examiner* — Hirdepal Singh
(74) *Attorney, Agent, or Firm* — Knobbe, Martens, Olson & Bear, LLP

(57) ABSTRACT

An information processing device has a display control section and a state detection section. The display control section instructs a display device to display road information regarding a roadway on which a vehicle runs. The display device is arranged inside of the vehicle. The state detection section detects at least one of cases A and B. In the case A, it is detected whether or not the vehicle is in a first state as a roundabout entry motion estimation in which the vehicle will enter a roundabout. In the case B, it is detected whether or not the own vehicle is in a second state in which the own vehicle is running on the roundabout. The display control section reduces information's visibility to the driver displayed on the display device when the state detection section detects at least one of the first state and the second state.

6 Claims, 3 Drawing Sheets

(56) References Cited

U.S. PATENT DOCUMENTS

| | | | |
|---|---|---|---|
| 2015/0002285 A1* | 1/2015 | Hatakeyama | B60K 35/00 340/435 |
| 2015/0213319 A1 | 7/2015 | Frenzel et al. | |
| 2015/0215550 A1 | 7/2015 | Frenzel et al. | |
| 2017/0031364 A1* | 2/2017 | Takahashi | G01C 21/20 |
| 2017/0166131 A1* | 6/2017 | Oba | B60R 1/002 |

* cited by examiner

- 50 DISPLAY DEVICE
- 51 DISPLAY WINDOW
- 52 IMAGE OF ROAD INFORMATION

- 50 DISPLAY DEVICE
- 51 DISPLAY WINDOW

- 50 DISPLAY DEVICE
- 51 DISPLAY WINDOW
- 53 IMAGE OF ROAD INFORMATION AFTER PIXELIZATION

INFORMATION PROCESSING DEVICE

CROSS-REFERENCE TO RELATED APPLICATION

This application is related to and claims priority from Japanese Patent Application No. 2015-201245 filed on Oct. 9, 2015, the contents of which are hereby incorporated by reference.

BACKGROUND OF THE INVENTION

1. Field of the Invention

The present invention relates to information processing devices or image data processing device for use in motor vehicles and other devices.

2. Description of the Related Art

There has been widely known and used vehicle technique to capture images regarding traffic signs on a roadway in front of an own vehicle having an in-vehicle camera and an information processing device. The in-vehicle camera sequentially captures front images in front of the own vehicle and/or side images of the own vehicle, and transmits these sequentially captured images to the information processing device mounted on the own vehicle. The information processing device receives the images transmitted from the in-vehicle camera, and executes a color coating process of the received images in order to obtain high accuracy when detecting various types of traffic signs from the images. Patent document 1, Japanese patent No. 4,604,088 discloses a conventional vehicle technique previously described.

If the information processing device instructs a display device mounted on the own vehicle to promptly provide, to the driver of the own vehicle, various types of road information such as a speed limit on a drive lane on which the own vehicle is running, the driver of the own vehicle receives the correct road information. This makes it possible to suppress occurrence of oversight of the driver of the own vehicle, and attract the driver's attention to the correct road information.

However, when the own vehicle approaches and enters a roundabout, and is passing through the roundabout, the speed limit value displayed on the display device before the entry of the roundabout usually varies. A roundabout is a type of circular intersection or junction in which road traffic flows continuously in one direction.

When the own vehicle is running on the roundabout, it is difficult for the driver of the own vehicle to receive correct speed limit information because the speed limit value usually varies before and after the roundabout.

SUMMARY

It is therefore desired to provide an information processing device to be mounted on motor vehicles, which is capable of suppressing driver's error recognition of traffic information on roundabouts, and providing correct traffic information to the driver of the vehicle when the own vehicle drives at a roundabout.

An exemplary embodiment provides an information processing device having a display control section and a state detection section. The display control section instructs a display device to display road information on its display window. The road information regards a roadway and traffic information on which an own vehicle is running. The display device is arranged inside of the own vehicle. The state detection section detects occurrence of at least one of a plurality of cases. That is, it is detected whether or not the own vehicle is in a first state as a roundabout entry motion estimation in which the own vehicle will enter a roundabout. Further, it is detected whether or not the own vehicle is in a second state in which the own vehicle is running on the roundabout. In particular, the display control section reduces information's visibility to the driver displayed on the display window of the display device when the state detection section detects at least one of the first state and the second state.

The improved structure of the information processing device previously described makes it possible to suppress occurrence of driver's incorrect recognition to road information such as speed limit and traffic signs because the reliability of the road information, having been acquired before the own vehicle approaches and enters a roundabout, deteriorates and often becomes low after the own vehicle has entered the roundabout.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
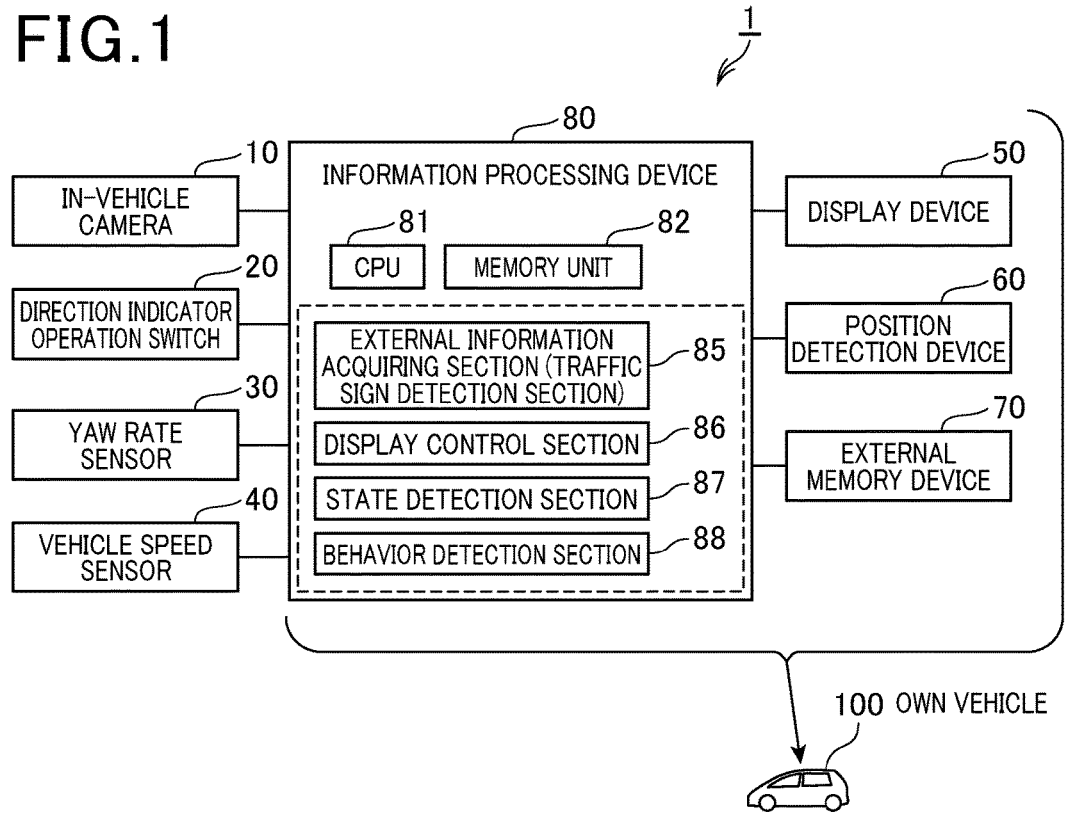
FIG. 1 is a view showing a block diagram of a structure of an information processing device in an information display system mounted on an own vehicle according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of an information processing device according to an exemplary embodiment with reference to FIG. 1 to FIG. 6.

(Structure)

FIG. 1 is a view showing a block diagram of a structure of the information display system 1 in an information display system 1 mounted on an own vehicle 100 according to an exemplary embodiment. As shown in FIG. 1, the information display system 1 is equipped with an in-vehicle camera 10, a direction indicator operation switch 20, a yaw rate sensor 30, a vehicle speed sensor 40, a display device 50, a position detection device 60, an external memory device 70, an information processing device 80, etc. The information display system 1 is mounted on the own vehicle 100.

The in-vehicle camera 10 sequentially acquires front images in front of the own vehicle 100. The in-vehicle camera 10 is arranged on the back of a rear view mirror of the own vehicle 100 in order to capture front images of the road surface of a roadway in a front direction of the own vehicle 100, for example. This front direction of the own vehicle 100 indicates the direction which extends forward from the own vehicle 100. The in-vehicle camera 10 captures front images of the own vehicle 100 every predetermined period of time, and outputs the captured images (hereinafter, image data) to the information processing device 80.

The direction indicator operation switch 20 is arranged near a steering wheel of the own vehicle 100 in order for the driver of the own vehicle 100 to operate the direction indicator operation switch 20. The direction indicator operation switch 20 instructs a direction indicator (not shown) of the own vehicle 100 to blink to show the direction to which the driver intends to operate the vehicle 100 to turn right or left. That is, when the driver of the own vehicle 100 operates the direction indicator operation switch 20, the direction indicator operation switch 20 generates and outputs a turn signal to the direction indicator (not shown). One of lamps (i.e., a right side lamp and a left side lamp) in the direction indicator is selected and driven, on the basis of the turn signal transmitted from the direction indicator operation switch 20, to blink in order to show the driver's intended turn direction. The direction indicator operation switch 20 also transmits the generated turn signal to the information processing device 80.

The yaw rate sensor 30 detects a turn direction of the own vehicle 100 and a turn angle, and outputs a yaw rate value to the information processing device 80. This turn direction indicates the direction to which the own vehicle 100 moves when viewed from the moving direction of the own vehicle 100. The turn angle indicates a magnitude of the turn motion of the own vehicle 100.

The yaw rate value has a positive sign or a negative sign which indicates the detected turn direction of the own vehicle 100. For example, the positive sign of the yaw rate value indicates the right turn direction when viewed from the moving direction of the own vehicle 100, and the negative sign of the yaw rate value indicates the left turn direction when viewed from the moving direction of the own vehicle 100. Further, an absolute value of the yaw rate value indicates a magnitude of the turn angle. The yaw rate value indicates the right direction or left direction.

The vehicle speed sensor 40 detects a vehicle speed of the own vehicle 100, and generates and outputs a vehicle speed signal to the information processing device 80. The vehicle speed signal corresponds to the detected vehicle speed of the own vehicle 100.

The display device 50 is arranged inside of the own vehicle 100, and has a display window 51 such as a liquid crystal display to display images on the basis of the control signals transmitted from the information processing device 80.

The position detection device 60 has a global positioning system (GPS) and a gyroscope. When receiving the vehicle speed signals transmitted from the vehicle speed sensor 40, the position detection device 60 detects a current position (or current location) of the own vehicle 100 on the basis of the received signals transmitted from the GPS and the vehicle speed sensor 40.

The external memory device 70 has memory mediums for storing map data regarding map information and traffic information of roadways, etc. That is, the map data stored in the external memory device 70 contain road data and various types of data to be used for performing map matching, rout searching and route guidance, etc. The map data contain location or position information of roundabouts and road information. A roundabout is a circular intersection designed for improved traffic flow traveling at slower speeds. The road information will be explained later.

The information processing device 80 is realized by using an available microcomputer system having a central processing unit (CPU) 81 and some semiconductor memories (hereinafter, a memory unit 82). The memory unit 82 has a random access memory (RAM), a read only memory (ROM), a flash memory, etc.

The information processing device 80 executes various control processes to perform various types of functions to assist and support the driving of the own vehicle 100. For example, the CPU 81 in the information processing device 80 reads out various types of programs stored in the memory unit 82 as a non-transitory solid-state storage medium, and executes the programs having various functions. It is acceptable for the information processing device 80 to be realized by using one or more microcomputer systems.

As shown in FIG. 1, the information processing device 80 has an external information acquiring section 85, a display control section 86, a state detection section 87 and a behavior detection section 88. The information processing device 80 executes the programs to realize the functions of the external information acquiring section 85, the display control section 86, the state detection section 87 and the behavior detection section 88. It is acceptable to use a hardware assembly composed of logical circuits, analogue circuits and/or a combination of them to realize the functions of the external information acquiring section 85, the display control section 86, the state detection section 87 and the behavior detection section 88.

The external information acquiring section 85 receives road information of a roadway on which the own vehicle 100 is running. The display device 50 provides acquired road information through the display window 51 to the drivers of the own vehicle 100 which is running on the roadway. That is, the road information contain road information obtained by wireless communication, FM multiplex broadcasting, etc. Specifically, the road information contain speed limit information of a roadway, a travel guidance information, etc.

In general, road signs contain regulation signs, warning signs, indicator signs, supplement signs, etc. The present invention can use methods capable of acquiring road information. That is, in addition to the road information obtained through wireless communication, FM multiplex broadcasting previously described, the information processing device 80 executes a known method such as a pattern matching of the images captured by the in-vehicle camera 10 in order to specify the traffic signs, etc., and provide road information indicated by the specified traffic signs on the roadway on which the own vehicle 100 is running. The information processing device 80 also reads out the road information which have been stored in the external memory device 70.

The external information acquiring section 85 detects the presence of a traffic sign which represents a roundabout from the image data captured by the in-vehicle camera 10. That is, the external information acquiring section 85 corresponds to the traffic sign detection section.

The display control section 86 instructs the display device 50 to display the road information acquired by the external information acquiring section 85. It is acceptable for the display control section 86 to instruct the external information acquiring section 85 to display a part of the image data captured by the in-vehicle camera 10 or image data which have been stored in the memory device 70. When the own vehicle enters a roundabout, the display control section 86 executes information deletion process for deleting displayed road information from the display device 50. This information deletion process performed by the display control section 86.

The state detection section 87 detects whether or not the own vehicle 100 is going to enter a roundabout on the basis of information received by the information processing device 80. Specifically, when the external information acquiring section 85 has detected a traffic sign, which represents the presence of a roundabout, extracted from the image data captured by the in-vehicle camera 10, the state detection section 87 detects the state in which the own vehicle 100 enters the roundabout.

It can be considered as a different detection method that the state detection section 87 detects the state in which the own vehicle 100 enters the roundabout on the basis of the current location of the own vehicle 100 acquired by the position detection device 60, and the location of the roundabout acquired from the memory unit 70.

In the information processing device 80 according to the exemplary embodiment, the state detection section 87 detects that the own vehicle 100 approaches and is going to enter the roundabout when a distance of the current location of the own vehicle 100 to the roundabout is not more than a predetermined distance threshold value, for example, 10 meters. In addition to the detection conditions previously described, it is also acceptable for the state detection section 87 to use additional condition that the own vehicle 100 moves towards the roundabout.

There is another detection method for detecting whether or not the own vehicle 100 enters a roundabout. This detection method executes image recognition using the image data captured by the in-vehicle camera 10 in order to detect the presence of a roundabout located in front of the own vehicle 100. When detecting the presence of the roundabout, it is possible for the behavior detection section 88 to determine that the own vehicle 100 is going to enter the roundabout.

The behavior detection section 88 detects occurrence of a roundabout entry motion estimation of the own vehicle 100 which indicates that the own vehicle 100 is going to enter the roundabout. This roundabout entry motion estimation of the own vehicle 100 is a supplemental detection for the own vehicle 100 entering a roundabout. Accordingly, it is sufficient for the behavior detection section 88 to correctly detect that the own vehicle 100 has entered the roundabout based on the roundabout entry motion estimation only.

For example, the behavior detection section 88 determines the roundabout entry motion estimation of the own vehicle 100 on the basis of the following conditions (i), (ii) and (iii).

Condition (i) in which an estimated travel lane coincides with a direction indicated by the turn signal.

A travel lane is a right side lane (in right hand traffic) or a left side lane (in left hand traffic) on which the own vehicle is running on a right and left hand traffic. The above estimated travel lane indicates a right side lane or left side lane on the roadway as the estimation result.

It is possible to estimate the travel lane of the own vehicle 100 on the basis of target objects extracted from the image data captured by the in-vehicle camera 10. There are various types of the target objects to be used for estimating the travel lane, for example, a location and content of traffic signs, lane lines, dotted lane boundary lines, etc. More specifically, when a traffic sign is located at a right side on the roadway on which the own vehicle 100 is running, it is possible to estimate and determine that the travel lane of the own vehicle 100 is right hand traffic on the roadway.

It is also acceptable to estimate the travel lane of the own vehicle 100 on the basis of traffic data instead of the image data which have been captured by the in-vehicle camera 10.

It is also acceptable to estimate the travel lane on the basis of map data which has been stored in the external memory device 70.

The direction indicated by the turn signal indicates the direction to which the direction indicator blinks on the basis of the driver's operation to the direction indicator operation switch 20. In other words, the direction indicated by the turn signal indicates the right or left direction to which one of lamps of the direction indicator is blinking.

At a roundabout, the own vehicle 100 drives in the direction of the travel lane, and enters the roundabout.

Figure 2:
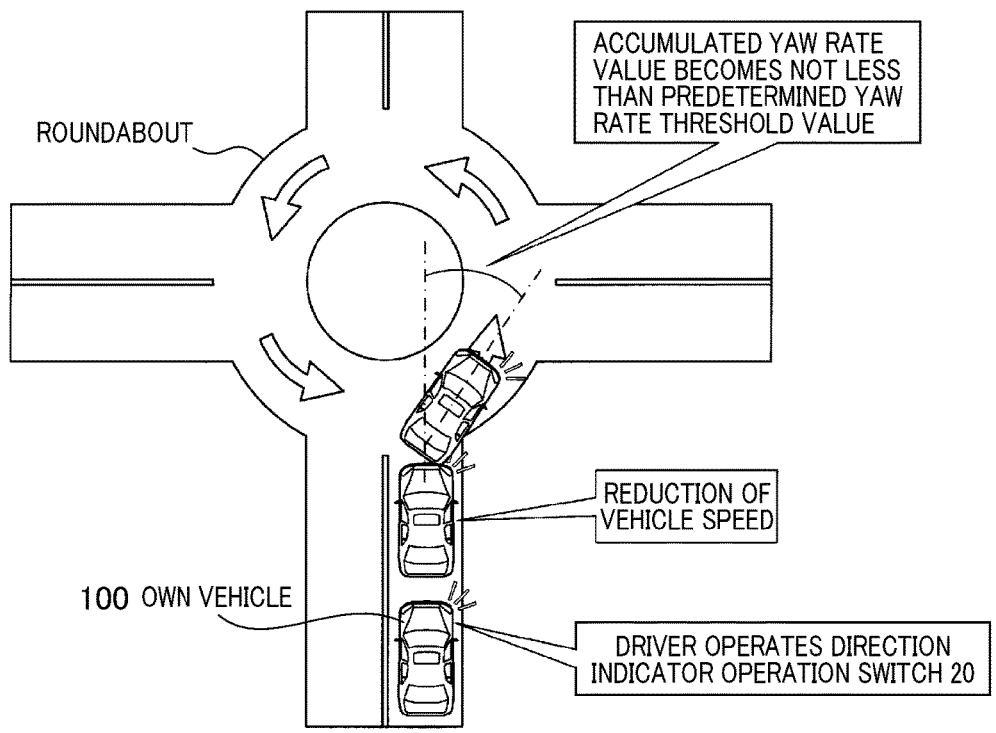
FIG. 2 is a view explaining a behavior of the own vehicle when approaching, entering and passing through a roundabout.

FIG. 2 is a view explaining the behavior of the own vehicle 100 when approaching, entering and passing through the roundabout.

In right hand traffic, as shown in FIG. 2, the own vehicle 100 drives to move right first, and enters the roundabout. On the other hand, in left hand traffic (not shown), the own vehicle 100 drives to move left first, and enters the roundabout.

In a case in which the driver of the own vehicle 100 intends to enter a roundabout, when the driver of the own vehicle 100 operates the direction indicator operation switch 20, the turn signal is generated and provided to the direction indicator to blink the right direction.

Accordingly, as previously described, when the estimated travel lane coincides with the direction indicated by the turn signal, in other words, when the turn direction of the own vehicle 100 at the roundabout coincides with the direction indicated by the blinking of the direction indicator of the own vehicle 100, it is possible to use one of the later-described conditions to be used for determining that the own vehicle 100 has entered the roundabout.

If there is no change of the travel lane when the own vehicle 100 is running, it is not necessary to estimate the travel lane, and it is sufficient to detect whether or not a predetermined travel lane coincides with the direction indicated by the turn signal.

There is another condition to be used for determining the roundabout entry motion estimation of the own vehicle 100. That is, it is acceptable for the behavior detection section 88 to use the condition for determining that the own vehicle 100 enters the roundabout because there are possible cases in which:

the own vehicle 100 approaches and enters the roundabout while the direction indicator is blinking to indicate the direction which is opposite to the turn direction of the own vehicle 100; and the own vehicle 100 approaches and enters the roundabout while the direction indicator does not blink.

Condition (ii) in which a vehicle speed of the own vehicle 100 is not more than a predetermined speed threshold value.

As has been shown in FIG. 2, when the own vehicle 100 approaches the roundabout, the driver of the own vehicle 100 gradually reduces the vehicle speed of the own vehicle 100, and the own vehicle 100 enters the roundabout safely, and drives at the roundabout at a reduced vehicle speed. Accordingly, it is possible for the behavior detection section 88 to estimate the roundabout entry motion of the own vehicle 100 into the roundabout when the own vehicle 100 runs at a speed of not more than the predetermined speed threshold value. For example, it is possible for the behavior detection section 88 to use a value of 60 km/h as the predetermined speed threshold value. However, the present invention does not limit the value of 60 km/h as the predetermined speed threshold value. It is possible to use a safe vehicle speed of not more than 60 km/h as the predetermined speed threshold value.

Condition (iii) in which an accumulated yaw rate value of the own vehicle 100 is not less than a predetermined turn threshold value.

As shown in FIG. 2, when having entered the roundabout, the own vehicle 100 drives at the roundabout.

When the accumulated yaw rate value becomes not less than the predetermine turn threshold value, it is possible for the behavior detection section 88 to estimate the roundabout entry motion of the own vehicle 100 to the roundabout when a turn amount of the own vehicle 100 is not less than a predetermined turn threshold value. The turn amount of the own vehicle 100 can be calculated on the basis of the accumulated yaw rate value.

For example, the predetermined turn threshold value is 30 degrees. However, the present invention does not limit the predetermined turn threshold value of 30 degrees. It is possible to use another value as the predetermined turn threshold value.

It is possible for the information processing device 80 to start the accumulation of the yaw rate value transmitted from the raw rate sensor 30 when the turn signal is generated or the distance to the roundabout calculated by the state detection section 87 becomes not more than a predetermined distance threshold value. However, the present invention is not limited to the calculation start timing indicated by these conditions.

(Process)

A description will now be given of the information deletion process executed by the information processing device 80 according to the exemplary embodiment with reference to FIG. 3.

Figure 3:
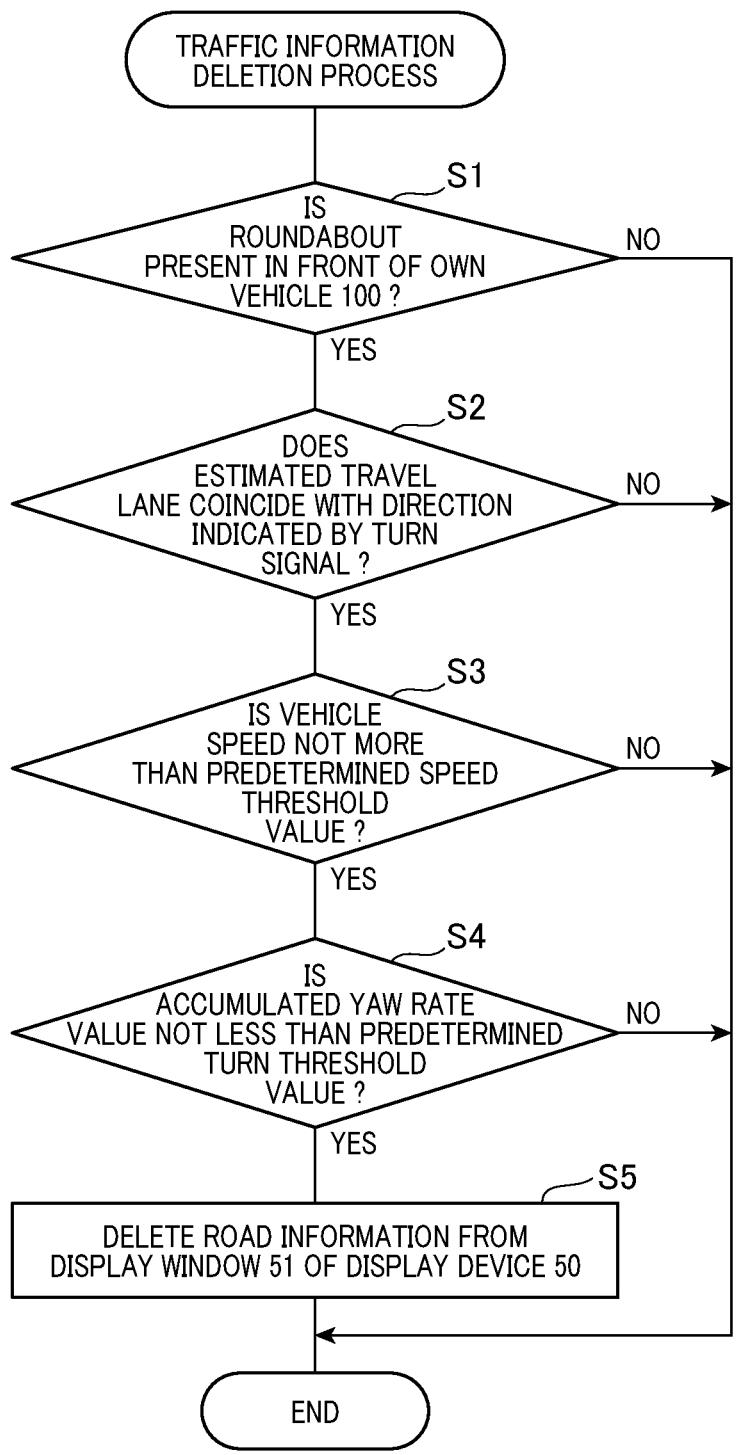
FIG. 3 is a flow chart showing an information deletion process executed by the information processing device shown in FIG. 1.

FIG. 3 is a flow chart showing the information deletion process performed by the information processing device 80 shown in FIG. 1.

The information processing device 80 starts to execute the information deletion process when the display device 50 displays road information.

In step S1 shown in FIG. 3, the CPU 81 detects whether or not the presence of a roundabout in front of the own vehicle 100. That is, the CPU 81 detects a current state whether or not the own vehicle 100 enters the roundabout. This process in step S1 corresponds to the process performed by the state detection section 87, and the current state corresponds to a first state.

When the detection result in step S1 indicates affirmation ("YES" in step S1), i.e. indicates a roundabout is present in front of the own vehicle 100, the operation flow progresses to step S2.

On the other hand, when the detection result in step S1 indicates negation ("NO" in step S1), i.e. indicates no roundabout is present in front of the own vehicle 100, the CPU 81 exits the information deletion process shown in FIG. 3.

In step S2, the CPU 81 detects whether or not the direction of the estimated drive lane coincides with the direction indicated by the turn signal. That is, as previously been explained by using the condition (i), the CPU 81 detects whether or not the behavior detection section 88 has detected the roundabout entry motion estimation.

When the detection result in step S2 indicates affirmation ("YES" in step S2), i.e. indicates that the direction of the estimated drive lane coincides with the direction indicated by the turn signal, the operation flow progresses to step S3.

On the other hand, when the detection result in step S2 indicates negation ("NO" in step S2), i.e. indicates that the direction of the estimated drive lane does not coincide with the direction indicated by the turn signal, the CPU 81 completes the information deletion process shown in FIG. 3.

In step S3, the CPU 81 detects whether or not the vehicle speed of the own vehicle 100 is not more than the predetermined speed threshold value. That is, as previously been explained by using the condition (ii), the CPU 81 detects whether or not the behavior detection section 88 has detected the entry motion estimation.

When the detection result in step S3 indicates affirmation ("YES" in step S3), i.e. indicates that the vehicle speed of the own vehicle 100 is not more than the predetermined speed threshold value, the operation flow progresses to step S4.

On the other hand, when the detection result in step S3 indicates negation ("NO" in step S3), i.e. indicates that the vehicle speed of the own vehicle 100 is more than the predetermined speed threshold value, the CPU 81 completes the information deletion process shown in FIG. 3.

In step S4, the CPU 81 detects whether or not the accumulated yaw rate value is not less than the predetermined turn threshold value, i.e. when the accumulated yaw rate value becomes not less than the predetermine turn threshold value. That is, as has previously been explained by using the condition (Iii), the CPU 81 detects whether or not the behavior detection section 88 has detected the roundabout entry motion estimation.

When the detection result in step S4 indicates affirmation ("YES" in step S4), i.e. indicates that the accumulated yaw rate value is not less than the predetermined turn threshold value, the operation flow progresses to step S5.

On the other hand, when the detection result in step S4 indicates negation ("NO" in step S4), i.e. indicates that the accumulated yaw rate value is not less than the predetermined turn threshold value, the CPU 81 completes the information deletion process shown in FIG. 3.

In step S5, the CPU 81 instructs the display device 50 to delete the road information from the display window 51.

Figure 4:
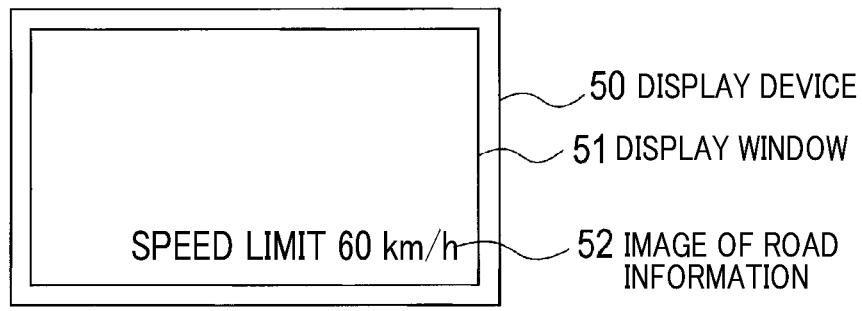
FIG. 4 is a view showing an example of road information with high visibility displayed on a display window of a display device.

FIG. 4 is a view showing an example of road information with high visibility displayed on the display window 51 of the display device 50.

As shown in FIG. 4, before the process in step S5, the display device 50 displays, on the display window 51, the road information which has been acquired by the external information acquiring section 85.

Figure 5:
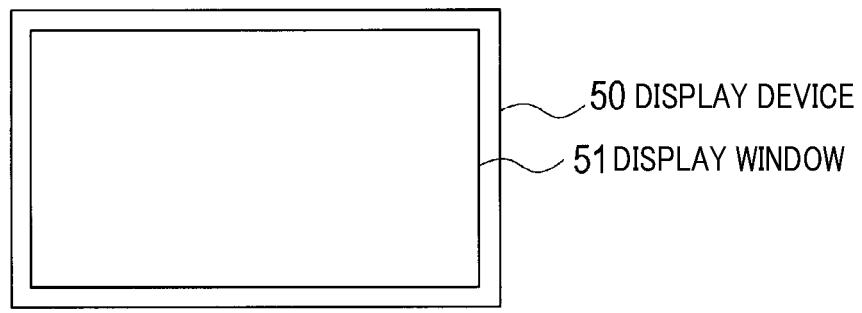
FIG. 5 is a view showing an example in which the road information has been deleted from the display window of the display device.

FIG. 5 is a view showing an example in which the road information has been deleted from the display window 51 of the display device 50. After the process in step S5, the road information has been deleted from the display window 51 of the display device 50.

After the process in step S5, the CPU 81 completes the information deletion process shown in FIG. 3.

(Effects)

A description will now been given of effects (1a) and (1b) of the information processing device 80 according to the exemplary embodiment previously described.

(1a)

When it is predicted that a vehicle is able to enter a roundabout, and the roundabout entry motion estimation of the own vehicle 100 is detected, the CPU 81 of the information processing device 80 instructs the display device 50 to delete the road information from the display window 51 of the display device 50. The own vehicle switches the current drive lane when the own vehicle 100 enters the roundabout. Because the road information before the entry of the roundabout is deleted from the display window 51 of the display device 50, it is possible to prevent incorrect road information from being provided to the driver of the own vehicle 100 when the own vehicle 100 enters the roundabout.

(1b) The information processing device 80 according to the exemplary embodiment deletes the road information, i.e. the road information image 52 displayed on the display window 51 of the display device 50 shown in FIG. 4 when detecting the signal representing the three operations as the roundabout entry motion of the own vehicle 100 after the state detection section 87 detects three behaviors of the roundabout entry motion estimation of the own vehicle 100. This makes it possible to increase the detection accuracy when detecting the roundabout entry motion of the own vehicle 100, and suppresses correct road information from deleting when the own vehicle does not enter any roundabout.

(Mother Modifications)

The concept of the present invention is not limited by the exemplary embodiment previously described. It is acceptable for the present invention to provide the following modifications (2a) to (2f).

(2a) The exemplary embodiment has shown the improved structure to predict for the own vehicle 100 to enter a roundabout, and delete the road information image 52 from the display window 51 of the display device 50 when the information processing device 80 detects the several conditions of the entry motion estimation of the own vehicle 100 to the roundabout. However, the concept of the present invention is not limited by the exemplary embodiment. It is acceptable for the information processing device 80 to erase the road information image 52 from the display window 51 of the display device 50 only when the information processing device 80 predicts that the own vehicle 100 will enter the roundabout.

Further, it is acceptable for the state detection section 87 to detect whether or not the own vehicle 100 is running on a roundabout. For example, it is possible for the state detection section 87 to detect that the own vehicle 100 is running on the roundabout when the current location of the own vehicle 100 acquired from the position detection device 60 is on the location of the roundabout on the basis of the road information data obtained from the external memory device 70.

Still further, it is possible for the state detection section 87 to execute an image recognition process of image data captured by the in-vehicle camera 10, and detect on the basis of the results of the image recognition process that the own vehicle 100 is running on the roundabout.

Further, then the state detection section 87 detects that the own vehicle 100 is running on a roundabout, it is possible for the CPU 81 of the information processing device 80 to instruct the display device 50 to delete the road information from the display window 51 of the display device 50. Still further, it is acceptable for the state detection section 87 to instruct the display device 50 to delete the road information from the display window 51 after the state detection section 87 has detected not less than two times that the own vehicle 100 is running on the roundabout.

This process in which the own vehicle 100 is running on the roundabout corresponds to a second state.

(2b) The exemplary embodiment has shown and explained the process of deleting the road information from the display window 51 of the display device 50 when the state detection section 87 has detected the three conditions (i), (ii) and (iii) as the roundabout entry motion estimation. However, the concept of the present invention is not limited by the exemplary embodiment. It is acceptable to delete the road information from the display window 51 of the display device 50 when the state detection section 87 has detected one or two of the conditions (i), (ii) and (iii).

For example, it is possible to delete the road information from the display window 51 of the display device 50 when the state detection section 87 has detected the two conditions (ii) and (iii). When a vehicle approaches and enters a roundabout, it is often different in the direction indicated by the direction indicator and the accumulated yaw rate value between the roundabout entry motion and a usual intersection entry motion. In this specific case, the use of the two conditions (ii) and (iii) makes it possible to increase the detection accuracy of the roundabout entry motion estimation of the own vehicle 100. That is, the information processing device 80 can perform the roundabout entry motion estimation with high accuracy on the basis of the use of the two conditions (ii) and (iii).

Still further, the concept of the present invention is not limited by using the three conditions (i), (ii) and (iii) when performing the roundabout entry motion estimation. It is acceptable to use another condition when performing the roundabout entry motion estimation.

(2c) As previously described, the exemplary embodiment has shown the example in which the CPU 81 of the information processing device 80 performs the information deletion process shown in FIG. 3 in order to delete the road information form the display window 51 of the display device 50. However, the concept of the present invention is not limited by this example. It is possible for the CPU 81 of the information processing device 80 to execute another process for reducing the information's visibility to the driver when the own vehicle 100 is running on a roundabout. The information's visibility to the driver indicates easy recognition of the road information.

In addition to the road information deletion process previously described, there is another possible process of reducing the information's visibility to the driver when the own vehicle 100 is running on a roundabout, in which at least a part of the road information image 52 displayed on the display window 51 is shown with a color of a background image on the display window 51. In other words, it is possible to reduce brightness, saturation, hue, etc. of the road information on the display window 51 of the display device 50.

Figure 6:
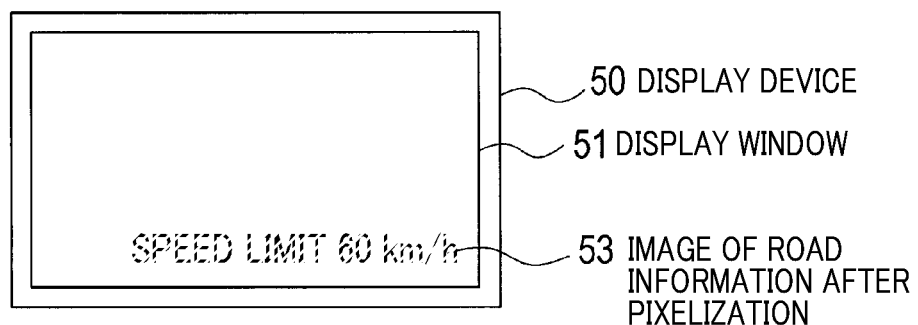
FIG. 6 is a view showing an example of road information with low visibility displayed on the display window of the display device.

FIG. 6 is a view showing an example of the road information with low visibility displayed on the display window 51 of the display device 50. As shown in FIG. 6, in order to reduce the information's visibility to the driver, it is acceptable to hide a part of the road information from the display window 51, apply pixelization to the road information, or reduce a character size of the road information.

(2d) It is possible to detach the information processing device 80 according to the exemplary embodiment of the present invention from the own vehicle 100. That is, the information processing device may be a detachable device. When the driver of the own vehicle 100 is put in the compartment of the own vehicle 100, and uses the information processing device of a detachable type forming the information display system 1 through a wired or wireless network communication.

(2e) While the information processing device 80 according to the exemplary embodiment of the present invention have been described in detail, it will be appreciated by those skilled in the art that various modifications and alternatives to those details could be developed in light of the overall teachings of the disclosure. For example, the M components (M is an integer of not less than one) forming the information processing device 80 according to the exemplary embodiment are divided to N components (N and M are integers, N>M), or N' components are assembled to provide M' components. (N' and M' are integers, N'>M') Accordingly, the particular arrangements disclosed are meant to be illustrative only and not limited to the scope of the present invention which is to be given the full breadth of the following claims and all equivalents thereof.

(2f) It is possible to provide the information display system 1 having the information processing device 80 according to the present invention. Further, it is also possible to realize the functions of the information processing device by using programs stored in a non-transitory solid-state storage medium such as semiconductor memories, and execute the programs having various functions. It is acceptable to realize the function of the CPU 81 as the road information deletion process by using programs stored in various types of memory device such as the external memory device 70.

What is claimed is:

1. An information processing device comprising a computer system including a central processing unit configured to provide:
   a display control section instructing a display device to display road information on a display window thereof, the road information being regarding a roadway on which an own vehicle is running, the display device being arranged inside of the own vehicle; and
   a state detection section detecting occurrence of at least one of cases:
   whether or not the own vehicle is in a first state as a roundabout entry motion estimation in which the own vehicle will enter a roundabout, and
   whether or not the own vehicle is in a second state in which the own vehicle is running on the roundabout;
   wherein the display control section reduce information's visibility to the driver of the own vehicle, displayed on the display window of the display device when the state detection section detects occurrence of at least one of the first state and the second state, and
   further comprising a behavior detection section detecting the roundabout entry motion estimation of the own vehicle in which the own vehicle approaches and is going to enter the roundabout,
   wherein the display control section reduces the information's visibility to the driver displayed on the display window of the display device when the state detection section has detected at least one of the first state and the second state, and the behavior detection section has detected the roundabout entry motion estimation of the own vehicle.

2. The information processing device according to claim 1, wherein the behavior detection section detects occurrence of the roundabout entry motion estimation of the own vehicle when at least one of conditions (i), (ii) and (iii):
   (i) a direction indicator of the own vehicle blinks to indicate a direction which coincides with a turn direction of the own vehicle when the own vehicle enters the roundabout;
   (ii) a vehicle speed of the own vehicle is not more than a predetermined speed threshold value; and
   (iii) a turn amount of the own vehicle is not less than a predetermine turn threshold value.

3. The information processing device according to claim 1, wherein the display control section instructs the display device to delete the road information from the display window in order to reduce the information's visibility to the driver.

4. The information processing device according to claim 1, further comprising an external information acquiring section detecting a traffic sign representing the roundabout in image data acquired by an in-vehicle camera of the own vehicle, the in-vehicle camera acquiring an external view of the own vehicle,
   wherein the state detection section detects occurrence of the first state when the external information acquiring section has detected the presence of the traffic sign representing the roundabout.

5. The information processing device according to claim 1, wherein the state detection section detects occurrence of the first state of the own vehicle on the basis of:
   a current location of the own vehicle obtained by a position detection device; and
   a location of the roundabout obtained from an external memory device.

6. The information processing device according to claim 1, wherein the state detection section detects occurrence of the second state of the own vehicle when a current location of the own vehicle obtained by a position detection device is present on a location of a roundabout obtained from an external memory device.

* * * * *